United States Patent [19]
King et al.

[11] Patent Number: 5,640,536
[45] Date of Patent: Jun. 17, 1997

[54] WORK STATION ARCHITECTURE WITH SELECTABLE CPU

[75] Inventors: Edward C. King, Fremont, Calif.; Anton Goeppel, Burgau, Germany

[73] Assignee: NCR Corporation, Dayton, Ohio

[21] Appl. No.: 752,819

[22] Filed: Aug. 30, 1991

[30] Foreign Application Priority Data

Aug. 31, 1990 [GB] United Kingdom ............ 9018991

[51] Int. Cl.$^6$ .................................................. G06F 13/42
[52] U.S. Cl. .................. 395/500; 364/229; 364/240; 364/240.8; 364/DIG. 1
[58] Field of Search ................... 395/325, 500, 395/550, 800

[56] References Cited

U.S. PATENT DOCUMENTS

| | | | |
|---|---|---|---|
| 4,638,451 | 1/1987 | Hester et al. | 395/275 |
| 4,667,305 | 5/1987 | Dill et al. | 395/500 |
| 4,964,074 | 10/1990 | Suzuki et al. | 395/500 |
| 4,967,346 | 10/1990 | Freidin | 395/500 |
| 5,097,437 | 3/1992 | Larson | 395/775 |
| 5,109,332 | 4/1992 | Culley | 395/325 |
| 5,155,839 | 10/1992 | Weppler | 395/500 |
| 5,321,827 | 6/1994 | Lu et al. | 395/500 |

FOREIGN PATENT DOCUMENTS

| | | |
|---|---|---|
| 0343770 | 11/1989 | European Pat. Off. . |
| 472274 | 2/1992 | European Pat. Off. . |

OTHER PUBLICATIONS

IBM Technical Disclosure Bulletin, vol. 32, No. 4A; Sep. 1989; New York U.S.; p. 467; "INTEL 80386 Or INTEL P9 Detection".

IBM Technical Disclosure Bulletin, vol. 32, No. 5B; Oct. 1989; New York U.S.; pp. 311–313; "Multiple Microprocessor Interfaces For a General–Purpose Control".

IBM Technical Disclosure Bulletin, vol. 33, No. 3B; Aug. 1990; New York U.S.; pp. 112–113; "32–Bit Memory Subsystem Supports 80386 And 80386SX Processors".

Chip Zeitschrift Fuer Mikrocomputer–Technik; No. 2; Feb. 1988; Wurzburg De pp. 62–68; L. Nachtman; "Die Neue PC–Generation".

*Primary Examiner*—Kevin J. Teska
*Assistant Examiner*—Ayni Mohamed
*Attorney, Agent, or Firm*—Douglas S. Foote; George H. Gates

[57] ABSTRACT

An architecture and method for operating a work station. The work station includes a CPU, a bus interface unit and a control line. The CPU is selected from a group of CPUs differing in certain operational parameters. The bus interface circuit is connected between an external bus and the CPU. The control line is connected to the interface circuit and provides a signal indicating the type of CPU connected to the circuit.

18 Claims, 11 Drawing Sheets

WORK STATION ARCHITECTURE WITH SELECTABLE CPU

This invention relates to a work station or similar data processing system of the kind including a central processing unit (CPU). More particularly, it relates to a work station architecture which allows flexibility in the selection of the CPU.

CROSS-REFERENCE TO RELATED APPLICATIONS

"Work Station Having Multiprocessing Capability" U.S. patent application Ser. No. 752,747, filed concurrently herewith and now abandoned, invented by Otto Duerrschmid and Edward C. King.

"Work Station or Similar Data Processing System Including Interfacing Means to Microchannel Means", U.S. patent application Ser. No. 752,710, filed concurrently herewith, invented by V. Thomas Powell, Anton Goeppel, Edward C. King and G. Roerhl.

"Work Station Including a Direct Memory Access Controller and Interfacing Means to Microchannel Means", U.S. patent application Ser. No. 753,273, filed concurrently herewith now Pat. No. 5,428,851, invented by Georg Dollinger and Edward C. King.

"Work Station and Method for Configuring Thereof", U.S. patent application Ser. No. 752,814, filed concurrently herewith now Pat. No. 5,452,424, invented by Anton Goeppel.

"Work Station Interfacing Means Having Burst Mode Capability", U.S. patent application Ser. No. 752,383, filed concurrently herewith now Pat. No. 5,410,656, invented by Edward C. King and Anton Goeppel.

"Internal Bus for Work Station Interfacing Means", U.S. patent application Ser. No. 752,371, filed concurrently herewith now Pat. No. 5,363,492, invented by Edward C. King and Anton Goeppel.

"Register Control for Workstation Interfacing Means", U.S. patent application Ser. No. 752,727, filed concurrently herewith now abandoned, invented by Anton Goeppel.

"Work Station Having Multiplexing and Burst Mode Capabilities", U.S. patent application Ser. No. 752,407, filed concurrently herewith now Pat. No. 5,440,754, invented by Anton Goeppel and Edward C. King.

"Work Station Including a Direct Memory Access Controller", U.S. patent application Ser. No. 752,815, filed concurrently herewith, invented by Anton Goeppel.

BACKGROUND OF THE INVENTION

Known work stations use a specific CPU, e.g. an Intel 80386 microprocessor provided on a system board together with other chip units, such as memories, various peripheral interfaces and a system bus controller. The CPU and the above mentioned units communicate with each other, partially through buffers, over a local bus comprising control, address and data lines, all units being under tight control of the CPU through the local bus. In general, the system design is tailored for the specific CPU. This means that a large variety of different chip units are required for work stations using different CPU's. The local bus also is tailored for the specific configuration. In order to maintain compatibility with other systems, detailed specifications rigidly determine the features and functions of the various units and their I/O registers. Thus, it is difficult to modify the system for expansion and improved performance.

OBJECTS OF THE INVENTION

It is a principal object of the present invention to provide a work station architecture having a flexibility which allows combinations with various types of CPUs.

It is a further object of the present invention to provide a work station having improved performance.

SUMMARY OF THE INVENTION

The present invention includes both an architecture and method for operating a work station. One form of the invention includes a CPU, a bus interface unit and a control line. The CPU is selected from a group of CPUs differing in certain operational parameters. The bus interface circuit is connected between an external bus and the CPU. The control line is connected to the interface circuit and provides a signal indicating the type of CPU connected to the circuit.

The present work station includes highly integrated, self-contained, functional blocks provided with intelligence and registers for flexibly combining with different types of CPUs. Each functional block serves as an active interface either for memory control (MIB), micro channel control (BIB) or local peripheral control (PIB). One or a plurality of MIBs or BIBs and one PIB communicate through a local bus with a selected CPU. The local bus is specifically extended as compared with the local bus of known work stations in order to provide more flexibility and improved performance. In particular the local bus according to a preferred embodiment of the invention comprises an additional control line which includes lines CT(0 . . . 1) for selecting the type of processor which has access to the local bus (host P/M bus). Additionally, up to four MIBs or BIBs may reside on the host P/M bus using a corresponding request signal BREQb(0 . . . 3) and a corresponding grant signal BGNTb(0 . . . 3) which serve to select an active functional block. Since only BIBs (other than the CPU) may be bus masters, only they need a BREQb line. Furthermore, the host P/M bus routes burst signals generated by one of the functional blocks (BIB) to other functional blocks (MIB or PIB). This is specifically applicable for a streaming mode in read/write operations between a micro channel and the memory where the BIB functional block assumes the role of a bus master sending data through the MIB functional unit to the memory.

Each functional block comprises an internal transaction bus enabling communication between the individual units within the functional block. Each unit has an ID number with which it is addressable over specific lines of the internal transaction bus. Each functional block is provided with configuration registers for individual configuration in a setup procedure, the configuration depending inter alia on the host CPU frequency and the capacity of the memory.

DESCRIPTION OF A PREFERRED EMBODIMENT

Figure 1:
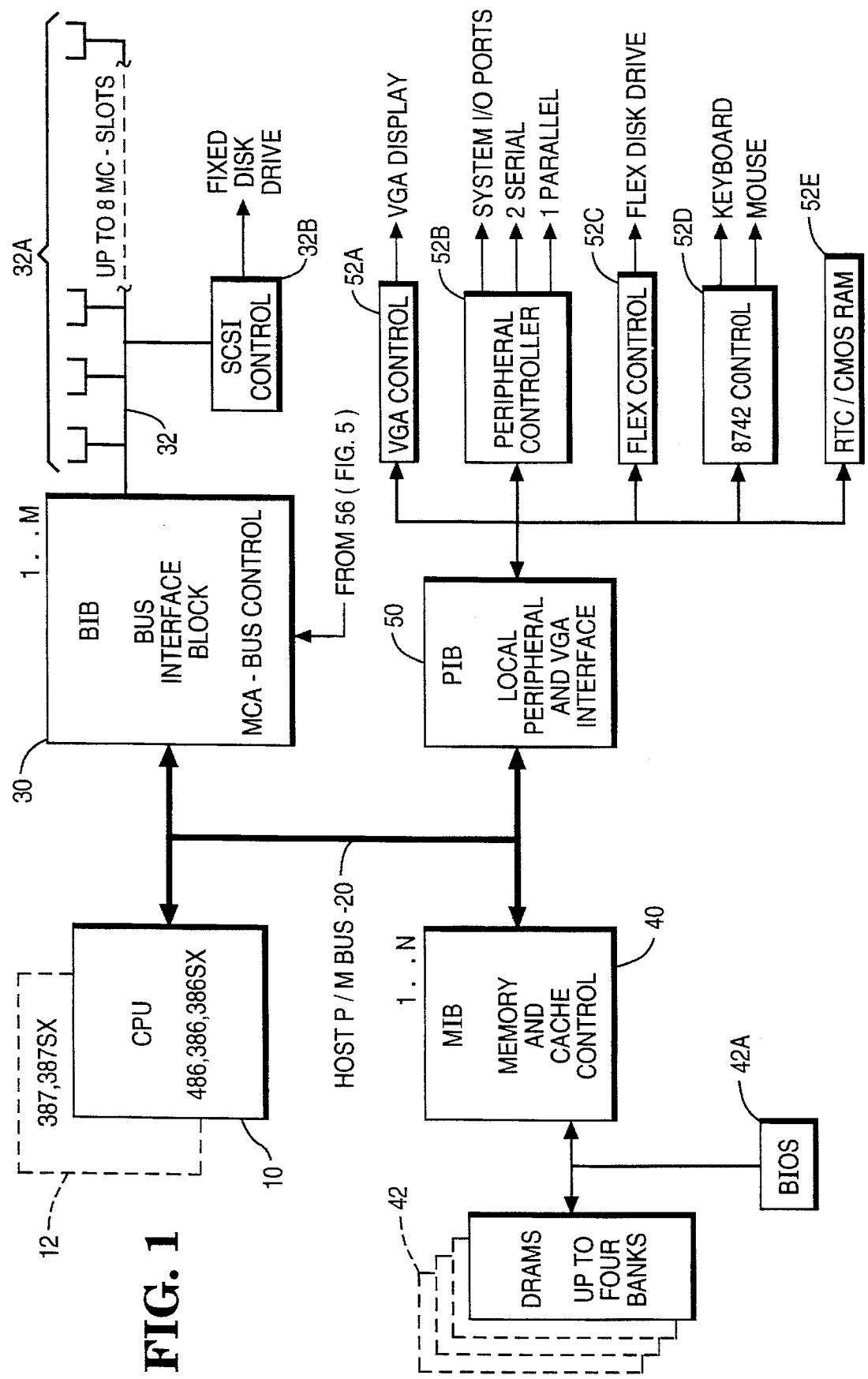
FIG. 1 is a schematic overall view of a work station architecture according to the invention illustrating the various functional blocks and the connections therebetween.

FIG. 1 shows a preferred embodiment of an architecture for a work station or data processing system according to the invention.

Basically, a CPU 10 communicates through a host P/M bus 20 with functional blocks 30, 40, and 50, and in particular with one or a plurality of bus interface circuits or blocks (BIB) 30 for microchannel access, with one or a plurality of memory interface circuits or blocks (MIB) 40 for memory and cache control and with a local peripheral and video graphics array (VGA) interface circuit or block PIB 50. It should be noted that it is possible to provide more than one BIB 30 and more than MIB 40.

An important feature of the invention is that CPU 10 may be selected from a group of CPUs differing in certain operational parameters. For example, in the disclosed architecture CPU 10 may be selected from the Intel 80386, 80386SX, and 80486 microprocessors. Also a coprocessor 12, such as a mathematical coprocessor Intel 80378, or 80387SX, may be added.

The functional block BIB 30 is provided as an interface circuit connected between the host P/M 20 and a microchannel bus 32. Microchannel 32 is provided with a plurality of slots 32a for attaching conventional adapter boards including adapter boards provided with a microprocessor which may act as a master in communication with other functional blocks of the work station. Furthermore, a control 32b is connected to the microchannel for controlling a fixed disk drive.

The functional block MIB 40 forms an interface circuit connected between the host P/M bus 20 and a DRAM memory 42 which may have different sizes with a presently usual size of 16 MB up to 64 MB. Furthermore, MIB 40 controls access to the usual BIOS ROM memory 42a.

Functional peripheral interface block (PIB) 50 forms an interface circuit connected between the host P/M bus 20 and various conventional system and peripheral units through peripheral control blocks 52. For example, there is provided a VGA control 52a, a peripheral controller 52b, a flexy disk control 52c, a keyboard/mouse control 52d, and a RTC/CMOS RAM unit 52e. All of these peripheral units are well known in the art; therefore, they will not be explained in detail.

According to the preferred embodiment each of the functional blocks BIB 30, MIB 40 and PIB 50 has been specifically designed as a single chip containing all elements such as registers and logic circuitry necessary to establish and perform communication between the host P/M bus 20 and the individual units connected to each functional block 30, 40, and 50.

As indicated in FIG. 1, it should be noted that a number m of BIBs 30 and a number of n MIBs 40 may be provided all connected to the host P/M bus 20. The BIBs 30 are respectively connected between host P/M bus 20 and a corresponding number of microchannel busses 32. The MIBs 40 are connected between host P/M bus 20 and respective memories. Thus, a large variety of configurations with different CPUs and quite different memory capacities may be implemented. Each chip may be configured differently to match various system configurations.

It should be understood that each functional block 30, 40, 50 is provided with some intelligence offering an operation which is relatively independent from the CPU operation generally governing all functions of the system.

Basically, each functional block 30, 40, 50 includes an interface unit between the host P/M bus 20 and an individual internal transaction bus. Though the timing is based on the CPU clock, all operations within the functional block such as read or write operations will be independently performed in one cycle whilst the CPU needs at least two cycles of the CPU block. Accordingly, this type of system architecture offers a considerably improved performance in view of the reduction of wait states for the CPU resulting in a higher overall operation speed.

Figure 3:
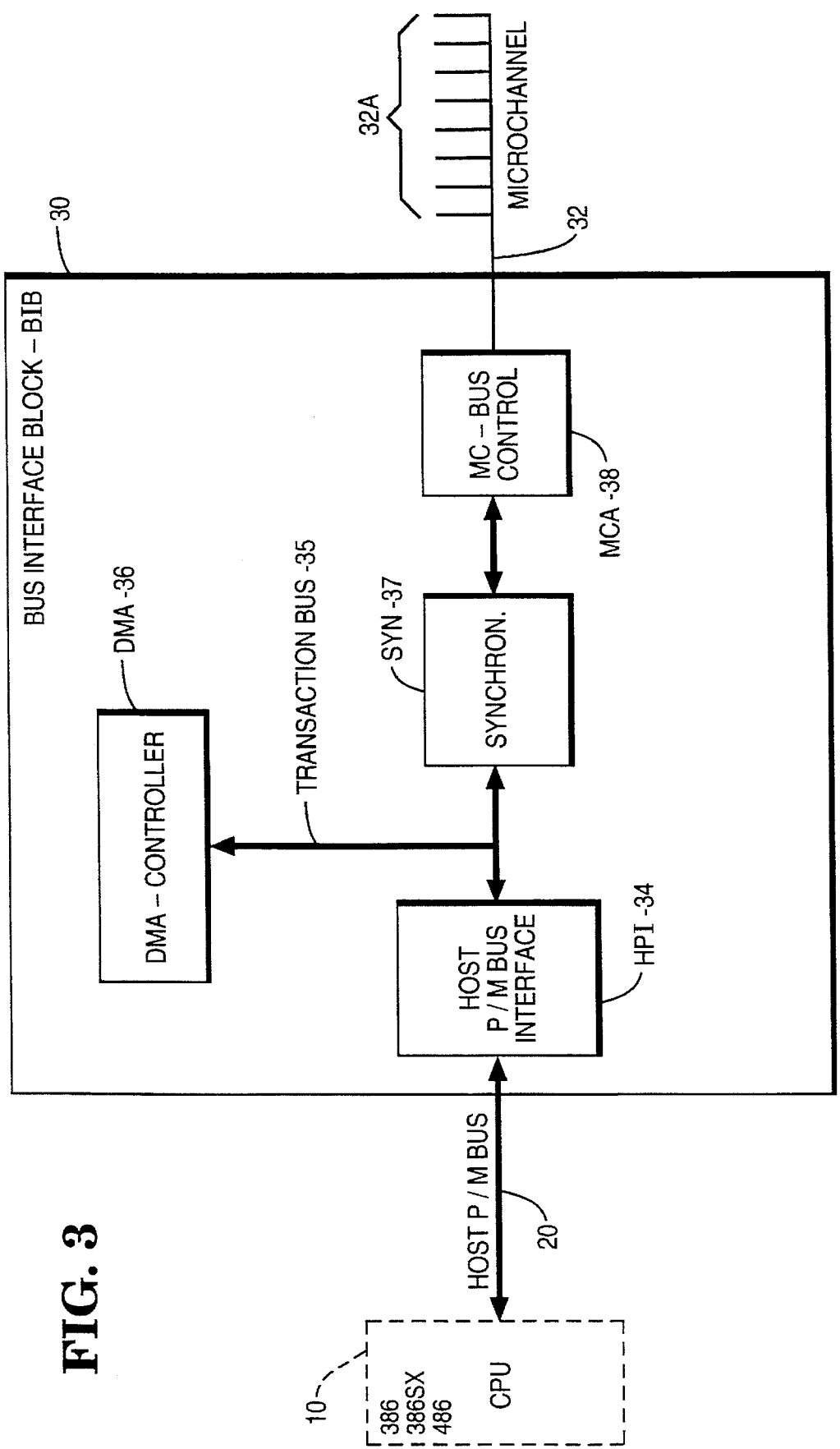
FIG. 3 is a block diagram of a bus interface block BIB.
Figure 4:
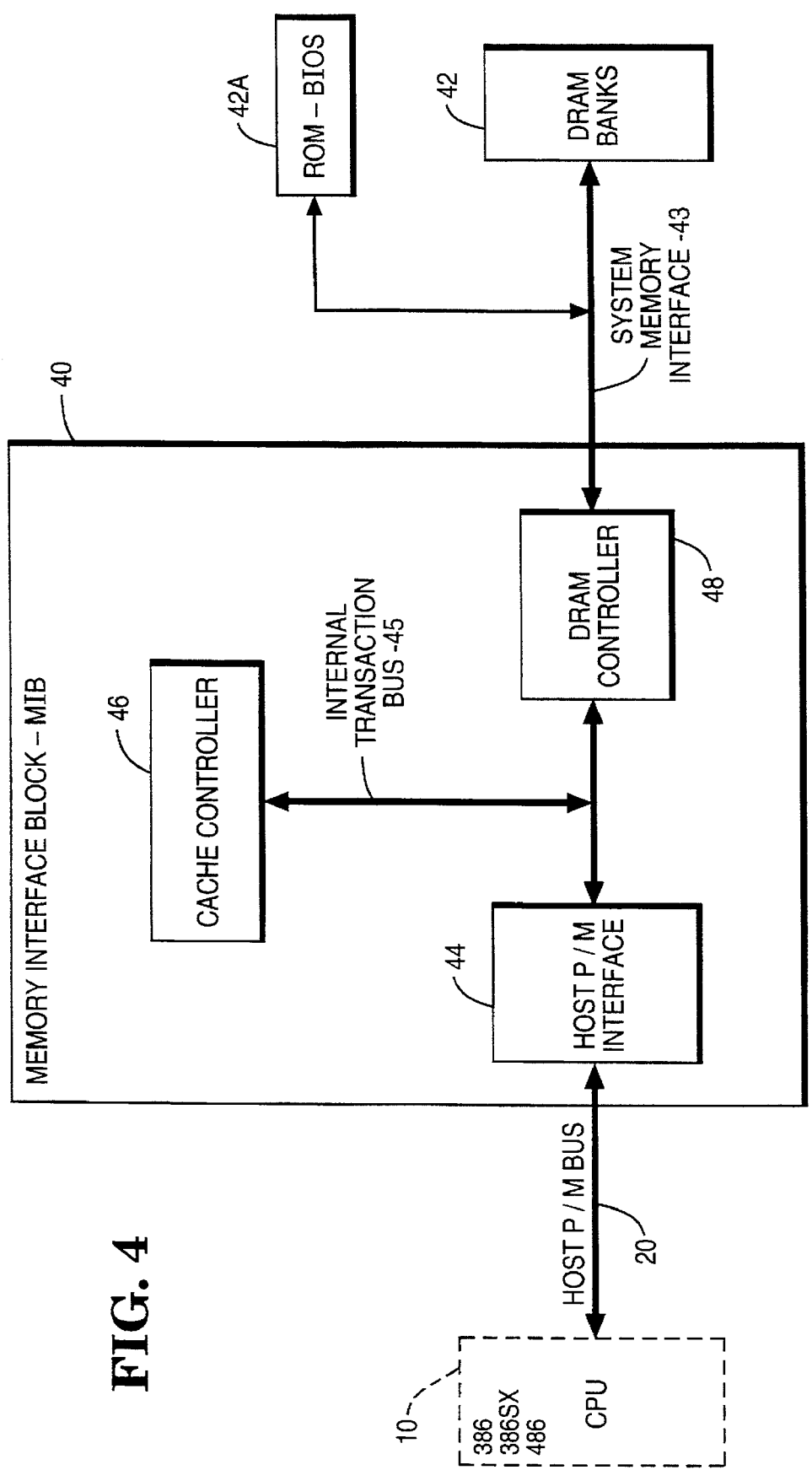
FIG. 4 is a block diagram of a memory interface block MIB.
Figure 5A:
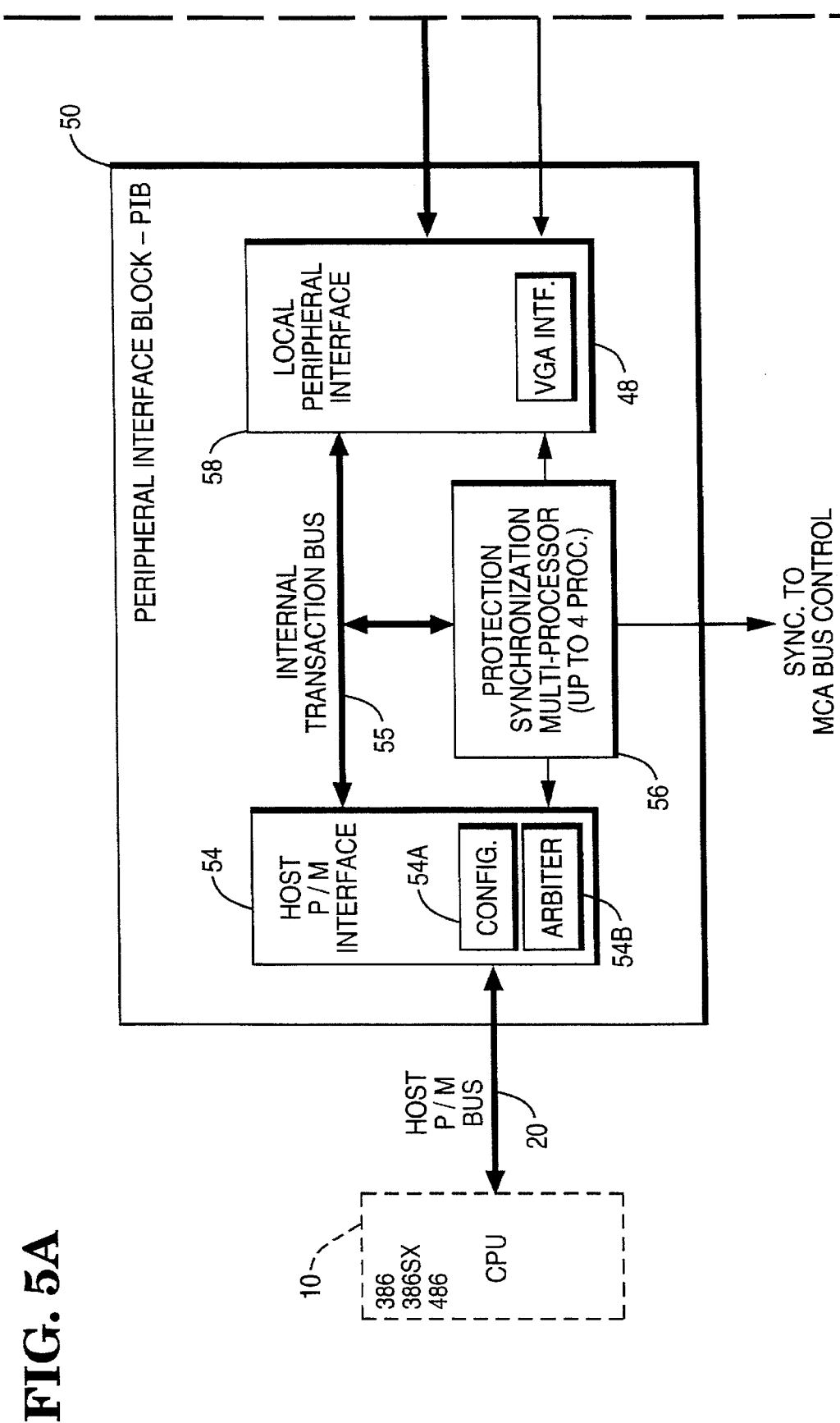
FIGS. 5A and 5B are block diagrams of a local peripheral and VGA interface PIB block.
Figure 5B:
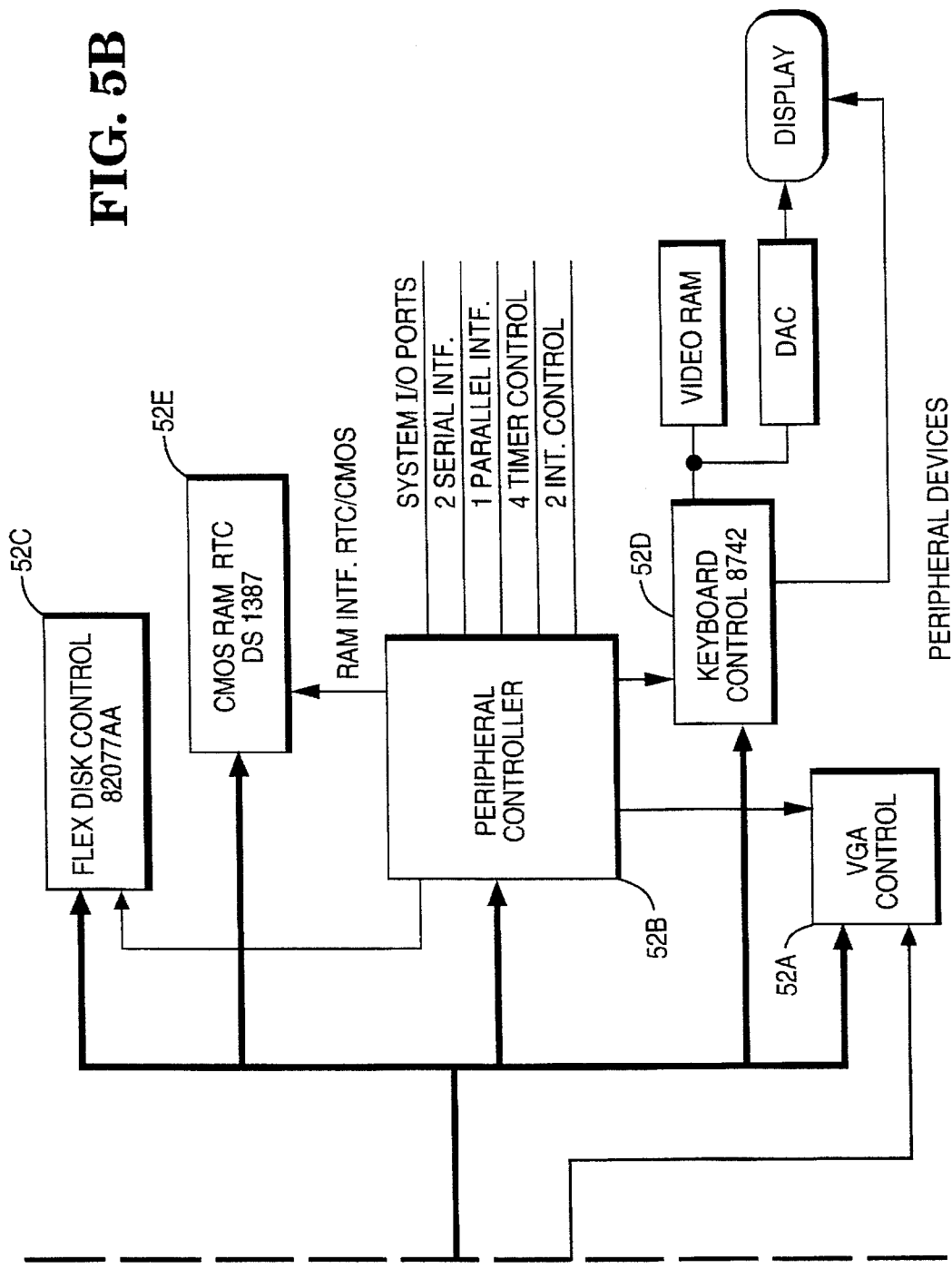

FIGS. 3 to 5 illustrate in some detail the units contained in each of the functional blocks 30, 40, and 50.

Specifically, referring to FIG. 3 the bus interface block BIB 30 comprises preferably arranged on one chip a host P/M bus interface HPI 34 forming an interface between the host P/M bus 20 and an internal transaction bus 35 providing communication connections to a synchronizing unit SYN 37 which is connected to a MC-bus control unit MCA 38 for access to the microchannel 32.

Further connected to the internal transaction bus 35 is a DMA controller 36 for controlling direct memory access.

Referring to FIG. 4 the preferably one chip memory interface block MIB 40 includes as basic units a host P/M interface 44 similar to the HPI 34 serving as an interface between the host P/M bus 20 and an internal transaction bus 45 which again is similar to the internal transaction bus 35 of the BIB 30.

Via the internal transaction bus 45, memory access is established to a cache controller 46 through a DRAM controller 48 on a system memory interface bus 43 to the DRAM memory 42.

Referring to FIG. 5 the preferably one chip peripheral interface block PIB 50 again includes a host P/M interface HPI 54 interfacing host P/M bus 20 with an internal transaction bus 55. The unit HPI 54 and the internal transaction bus 55 correspond to the respective elements 34, 44, and 35, 45 of the BIB 30 and the MIB 40, respectively.

Furthermore, PIB 50 has arranged in communication with the internal transaction bus 55 a synchronizing unit 56 for MCA bus control and a local peripheral interface LPI 58 for establishing access to the system and peripheral units 52a to 52e mentioned before.

Now, as stated above, the work station according to the invention offers high flexibility in respect of using one of various types of CPUs. In addition, there is flexibility in the number of microchannels and DRAM memory units to be included in the system. This is in contrast to known work stations where a predetermined CPU communicates with one microchannel and one DRAM memory block only. This feature of the invention is achieved by a specifically extended host P/M bus which is illustrated in FIGS. 2A–2E in detail.

Specifically, within the block CPU 10 the conventional input/output ports of a microprocessor as Intel 80386, etc. are listed as address ports A(2, . . . 31), data ports D(0, . . . 31), byte enable ports BEb(0, . . . 3), an address status output ADSb which indicates that a valid bus cycle definition and address are available and which is driven active in the same clock as the addresses are given. ADSb is active low. The system clock PCLK, having a predetermined frequency, is generated by a clock oscillator 60 and supplied to the input port PCLK of the CPU 10 and the functional blocks BIB 30, MIB 40, and PIB 50. These and all other input/output ports of the CPU 10 and the signal presented there are conventional. Thus, they will not be explained in detail. However, another feature of the invention is that oscillators of different frequencies may be connected to the system in place of oscillator 60. For example, oscillator 60 could have a frequency of 16 MHz, 20 MHz, or 33 MHz.

Figure 2A:
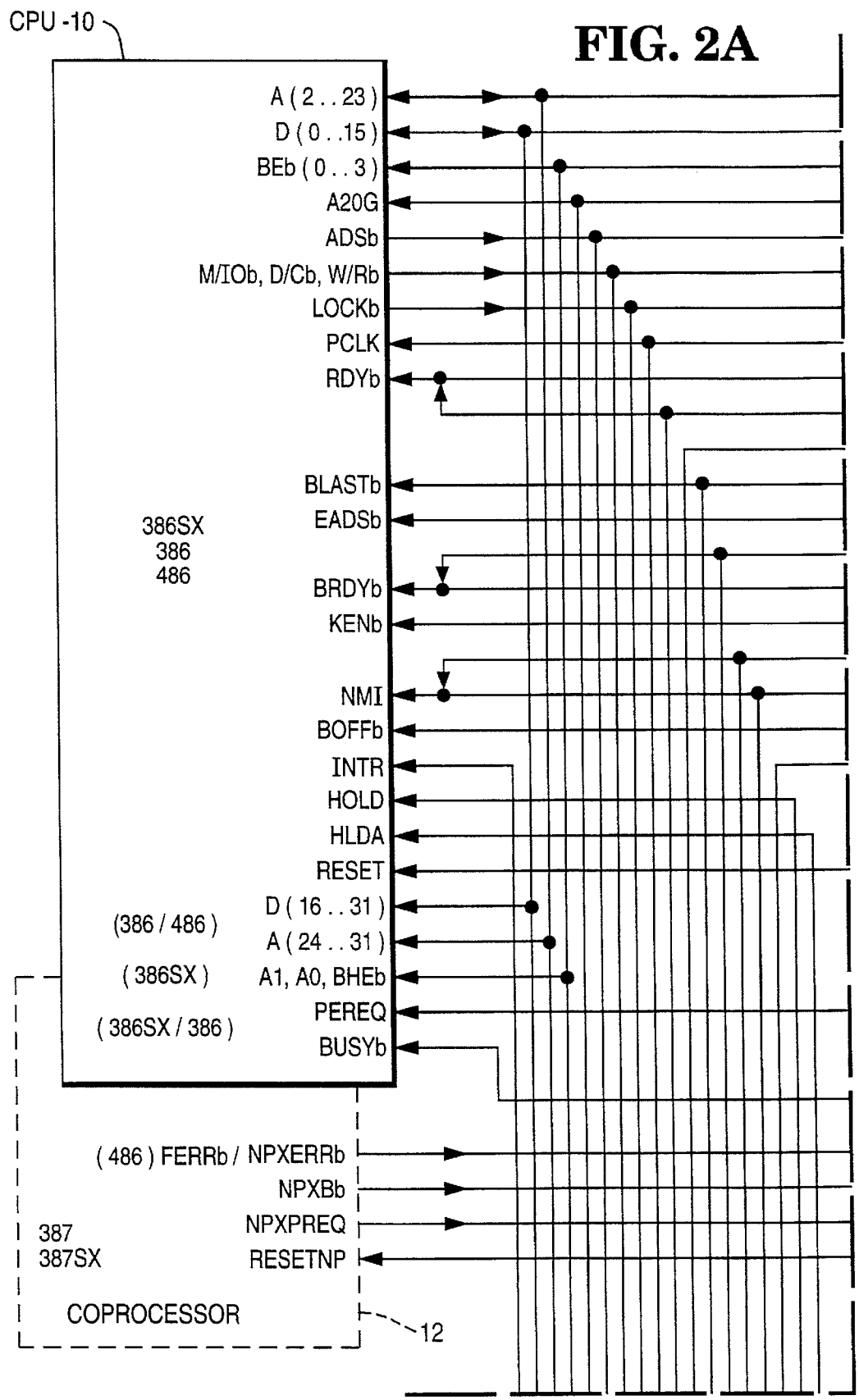
FIGS. 2A–2E are a diagram showing in detail a host P/M bus as used to connect the various functional locks with each other.
Figure 2B:
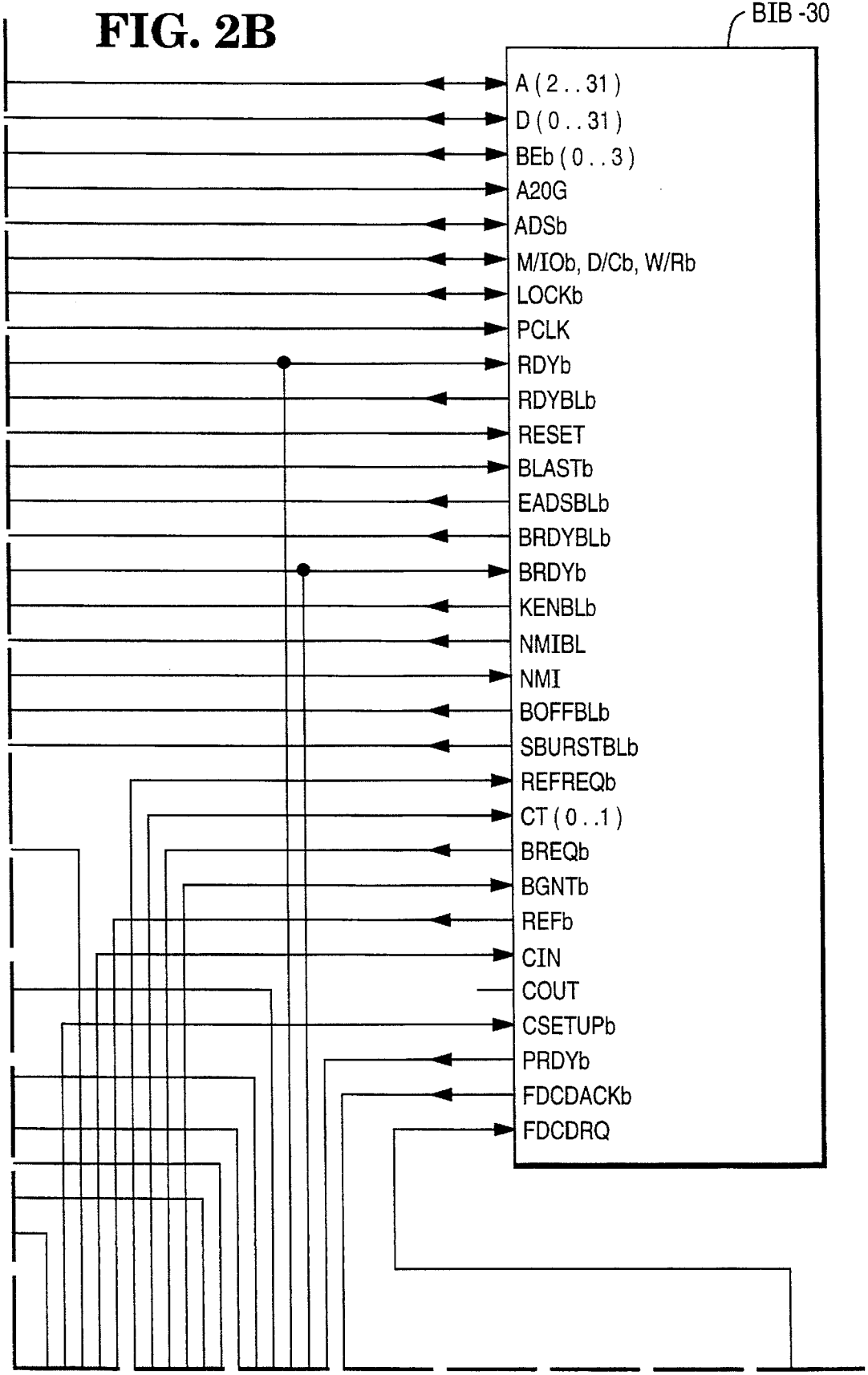
Figure 2C:
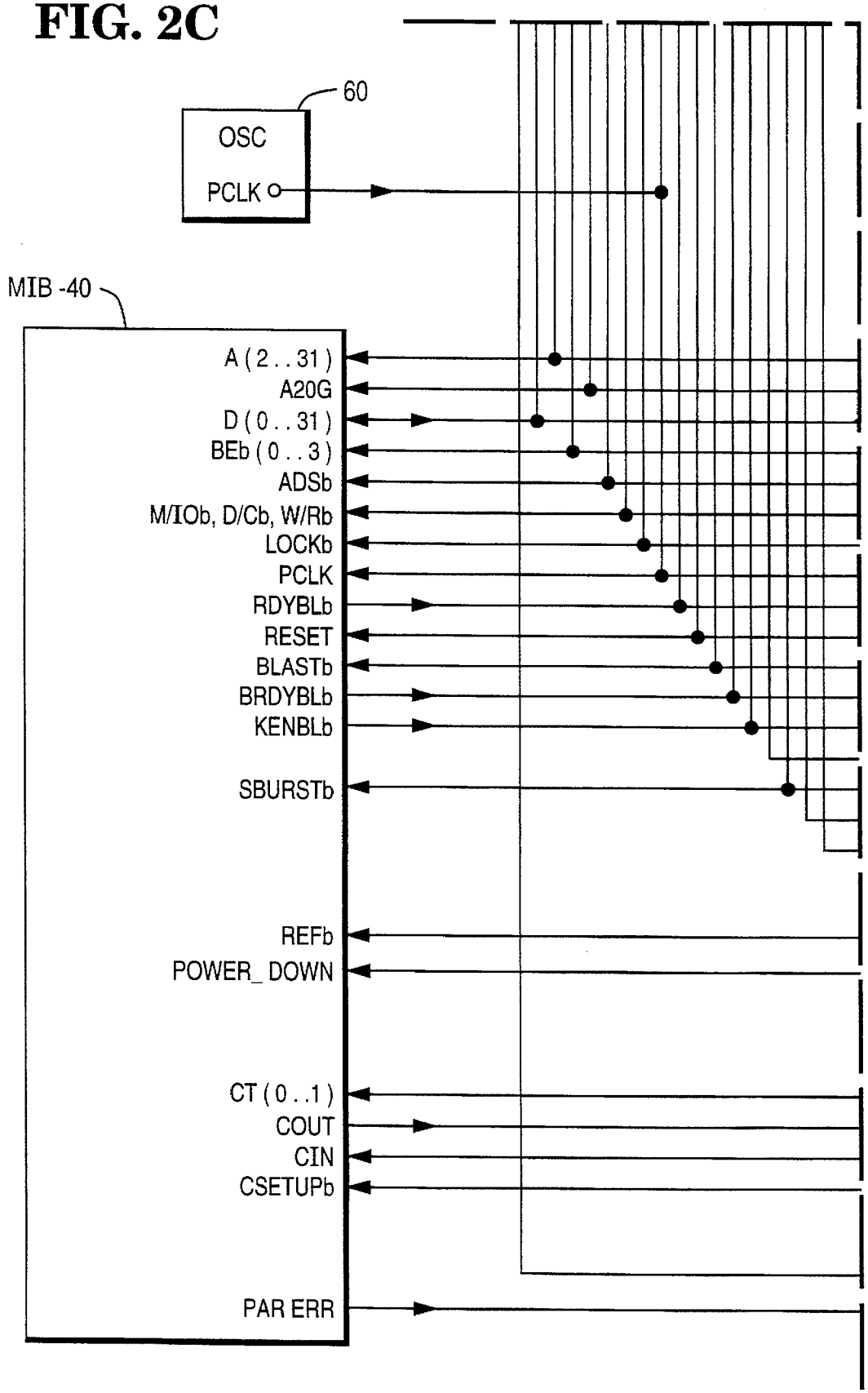
Figure 2D:
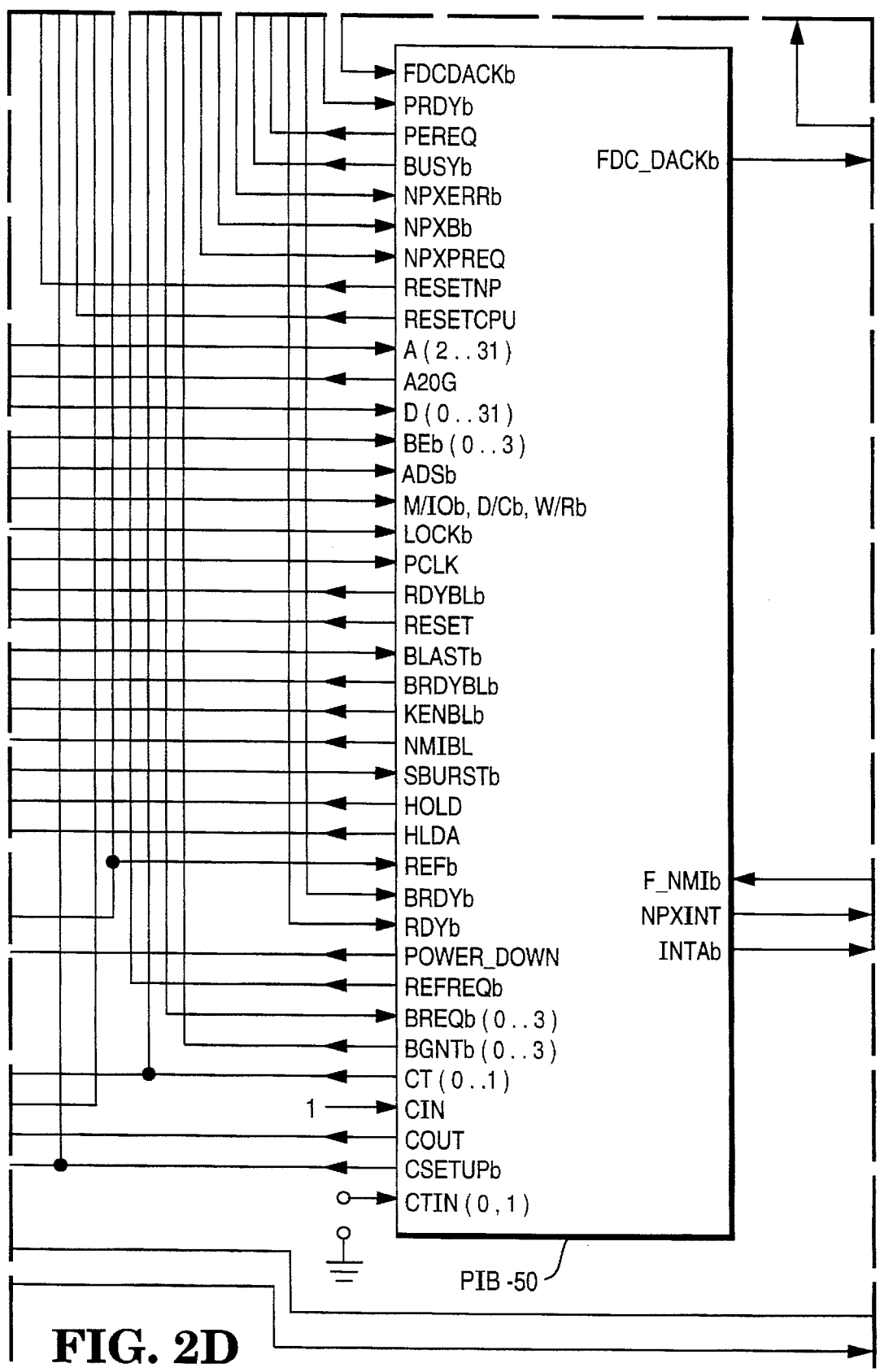

As may be gathered from FIGS. 2A and 2B the functional blocks BIB 30, MIB 40, and PIB 50 are provided with similar input/output ports as the CPU. However, there are several additional ports and associated bus lines connecting corresponding ports of the functional blocks and the CPU with each other.

In connection with this invention the following ports and corresponding signals are of specific interest:

TABLE 1

CT(0 . . 1): The combination of the two lines included in the host P/M bus indicates the type of processor (functional block) which has access to the host P/M bus. For example, CT1 = 1, and CT0 = 0 may mean that the host CPU 10 is an Intel 40486 processor. It should be noted that the signals on these two lines are transmitted by the PIB 50 to each of any BIBs 30 and MIBs 40.
BREQb(0 . . 3): This is a host P/M bus request signal with the assumption that four BIBs 30 may be provided each being connected with the PIB 50 by one request line. (Further description will be given below).
BGNTb(0 . . 3): This is a host P/M bus grant signal transmitted by the PIB 50 to one of the BIBs 30 having requested access to the host P/M bus by BREQb(0 . . . 3). (Further description will be given below.)
SBURSTBLb: This is generated by one of the functional blocks BIB 30 of the chip set, specifically one of the BIBs 30 only if the host CPU 10 is currently not bus master, to specify a BURST operation. It is used to temporarily halt the transfer in burst mode but keeps the burst condition established. With this signal the master is able to stop the transfer temporarily in burst mode.
RDYb: The nob burst ready indicates that the current bus cycle is complete. RDYb indicates that a functional unit of the system has presented valid data on the data lines in response to a read or that a functional unit of the system has accepted data from the processor in response to a write.
RDYBLb(N): The non burst ready block is the RDYb signal generated by one of the functional blocks of the chip set.
BRDYb(N): The burst ready input performs the same function during a burst cycle that RDYb performs during a non-burst cycle. BRDYb indicates that valid data are presented on the data lines in response to a read or the data on the line are accepted to a write. The data presented on the data bus will be stored into the processor when BRDYb is sampled active.
BRDYBLb(N): The burst ready block is the BYRDb signal generated by one of the functional blocks of the chip set.
LOCKb: The bus lock line indicates that the current bus cycle is locked. The processor will not allow a bus hold when LOCKb is asserted. LOCKb goes active in the first clock of the first locked bus cycle and goes inactive after the last clock of the last locked bus cycle. The last locked cycle ends when ready is returned. LOCKb is active low. If CT0 and CT1 are set to 11 (from the PIB 50) then LOCKb is active as long as the system should remain in burst condition. This is used for microchannel (MCA) streaming mode.
CIN: This is the chain input signal used in a system configuration routine (see also COUT).
COUT: This chain output signal is used in a system configuration routine. Specifically, after configuration of one functional block it transmits its COUT signal to be applied as the CIN signal to the next functional block and so on.

Another feature of the system is that after the CPU sends a command to a functional block the latter performs this command without further control by the CPU. For example, such a command sent to BIB 30 may be write data from microchannel 32 to DRAM 42. As will be appreciated, each functional block contains the logic and circuitry, such as flip-flops, to perform such processes. All this is contained in a so called "state machine" which may be implemented by a skilled person according to the specific requirements and processes to be performed.

Figure 6:
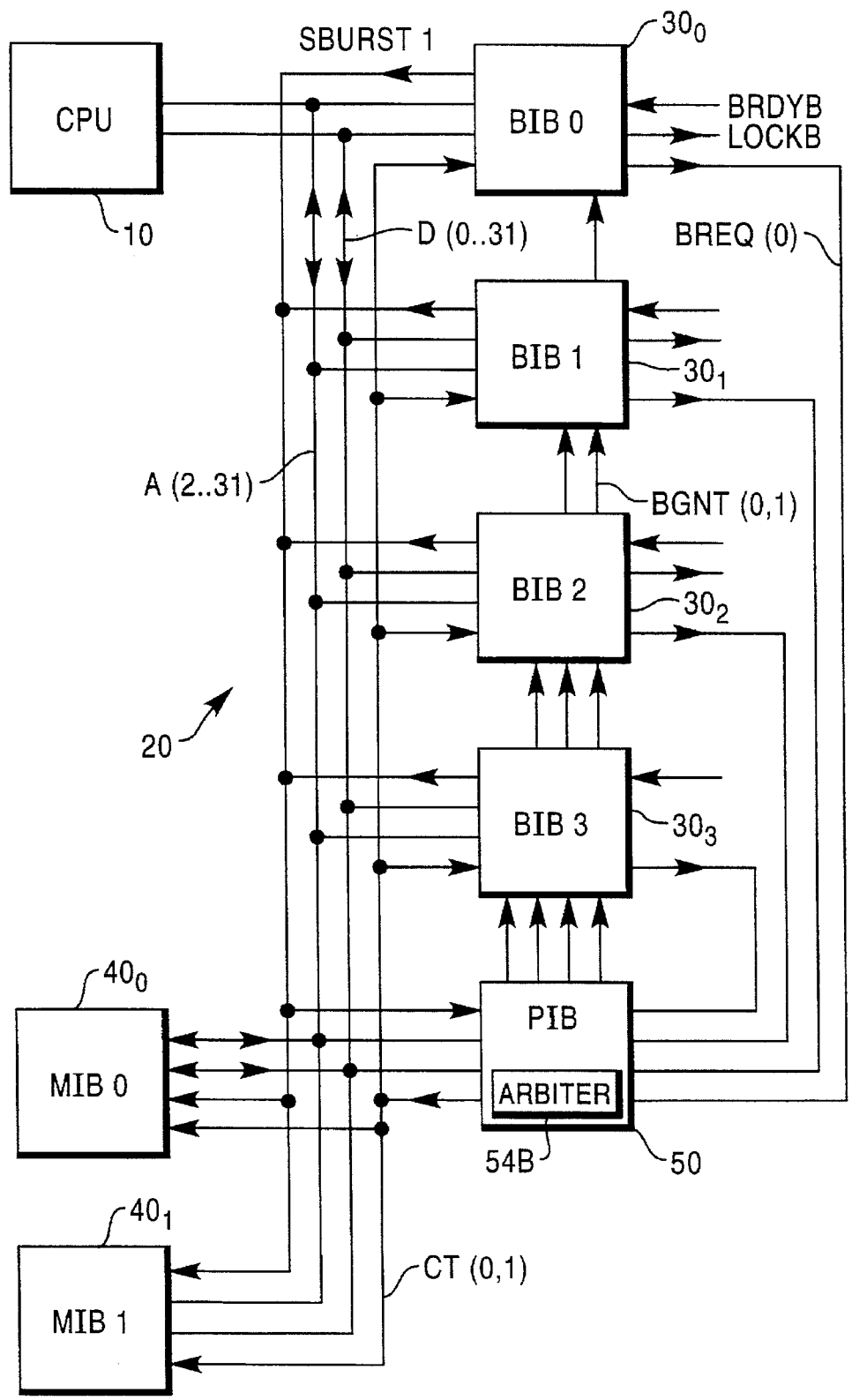
FIG. 6 is a block diagram illustrating the provision of a plurality of BIBs and MIBs according to one form of the present invention.

Referring now to FIG. 6 a further explanation will be given in respect of the routing and purpose of the above listed signals. For example, it is assumed that there are provided four functional blocks BIB 0 to BIB 3 marked with the reference numerals $30_0$ to $30_3$. Furthermore, there are provided two functional blocks MIB 0 and MIB 1 marked with reference numerals $40_0$ and $40_1$.

All the lines illustrated are part of the host P/M bus 20 as are the address lines A(2, . . . 31) and the data lines D(0, . . . 31).

Furthermore, as a specific feature there are two lines CT0 and CT1 (indicated and sometimes referred to as one line only) for indicating the type of host processor used or whether a functional block BIB 30 is bus master having access to the host P/M bus. It should be noted that these two lines may be switched dynamically on a cycle basis. This information is transmitted from the PIB 50 to all MIBs 40 and all BIBs 30. For example, CT0=1, and CT1=0, may indicate that the CPU is a 486 and is the bus master, whereas CT0=1, and CT1=1, may indicate that the bus master is BIB 30.

Referring to FIGS. 5 and 6 the PIB 50 and specifically its HPI 54 includes an arbiter circuit 54b. Each of the BIBs $30_0$–$30_3$ is connected with the PIB 50 by a host P/M bus request line BREQ(0) to BREQ(3), respectively. Furthermore, the PIB 50 is connected with each of the BIBs 0–3 through BGNT 0 to BGNT 3 lines for a host P/M bus grant signal.

In operation, if one of the BIBs $30_0$–$30_3$ needs access to the host P/M bus 20 it sends a corresponding request signal BREQ 0–3 to the PIB 50 which upon arbitration in the arbiter 54b according to predetermined priorities allotted to the individual BIBs grants access to that of the requesting BIBs $30_0$–$30_3$ having highest priority.

Thus, the host CPU is relieved from this task with the result of improved performance.

As mentioned before, the work station according to the invention may use different types of CPUs. Furthermore, such a work station may operate with different frequencies, e.g. from 16 MHz to 33 MHz. Therefore, quite a number of system configurations are available using the same functional blocks, i.e. BIBs 30, MIBs 40, and the PIB 50. These variations require specific adaptations of the functional blocks to a specific configuration.

For this purpose each functional block includes preferably in its host P/M interface HPI 34, 44 and 54, respectively, configuration registers one of which being indicated as configuration register in HPI 54 of FIG. 5.

In principle, all the functional blocks may be configured in a setup procedure known as "program option select" procedure. For the preferred embodiment of the invention a specific configuration procedure is used which is explained in detail in the co-pending patent application with the title "A Method of System Configuration of a Work Station" filed at the same date as the present application.

With reference to FIG. 6 and Table 1 (signal definitions) the basic operation of the work station, according to a preferred embodiment, will now be explained. The architecture is designed so that one of a group of CPUs, e.g., an Intel 80386, 80386SX or 80486, may be selected for connection to host P/M bus 20. The group of CPUs will differ in operational characteristics. For example, an Intel 80386 divides the frequency of the system clock signal (PCLK) by 2 to time its operation. In contrast, the Intel 80486 does not divide the clock signal and operates at the same frequency as the system clock.

When the system is installed, information as to the type of connected CPU is provided. For example, a predetermined arrangement of switches can be set by the installer to indicate a particular type of CPU. In a preferred embodiment, switches are set on the PIB board to indicate the type of CPU. As noted previously, control line CT(0 . . . 1) contains 2 lines. Thus, in the disclosed embodiment, there are 4 signals, (0,0), (1,0), (0,1), and (1,1), which may be provided. Three of these are reserved to indicate whether an 80386, 80386SX or 80486 CPU is connected to host P/M bus 20. The fourth signal is activated when BIB 30 is bus master. It will be remembered that a feature of the present work station is the ability of BIB 30 to function as bus master of host P/M bus 20 to relieve CPU 10. Clearly, more CT lines can be employed if more than three different types of CPUs are connectable to the work station.

When the system is started, oscillator 60 generates a clock signal at a predetermined frequency. Certain types of CPUs connected to host P/M bus 20 will change the frequency of the clock signal it receives to time its operation. As noted above, an 80386 CPU divides the frequency in half. The clock signal from oscillator 60 is also provided to BIB 30. BIB 30 responds to the signal on the CT lines by changing the frequency of the clock signal in the same manner as CPU 10. For example, if the signal on the CT lines indicates that CPU 10 is an 80386, BIB 30 will divide the frequency in half. On the other hand, if the signal on the CT lines indicates that the processor is an 80486, which does not change the frequency of the clock signal, BIB 30 will similarly not change its frequency.

BIB 30 uses the converted frequency to time the transfer of data between BIB 30 and host P/M bus 10. Furthermore, by changing the frequency of the clock signal to the same frequency as the CPU, communication between the various functional blocks and CPU 10 is possible during start-up and the initialization phase of the system.

Figure 2:
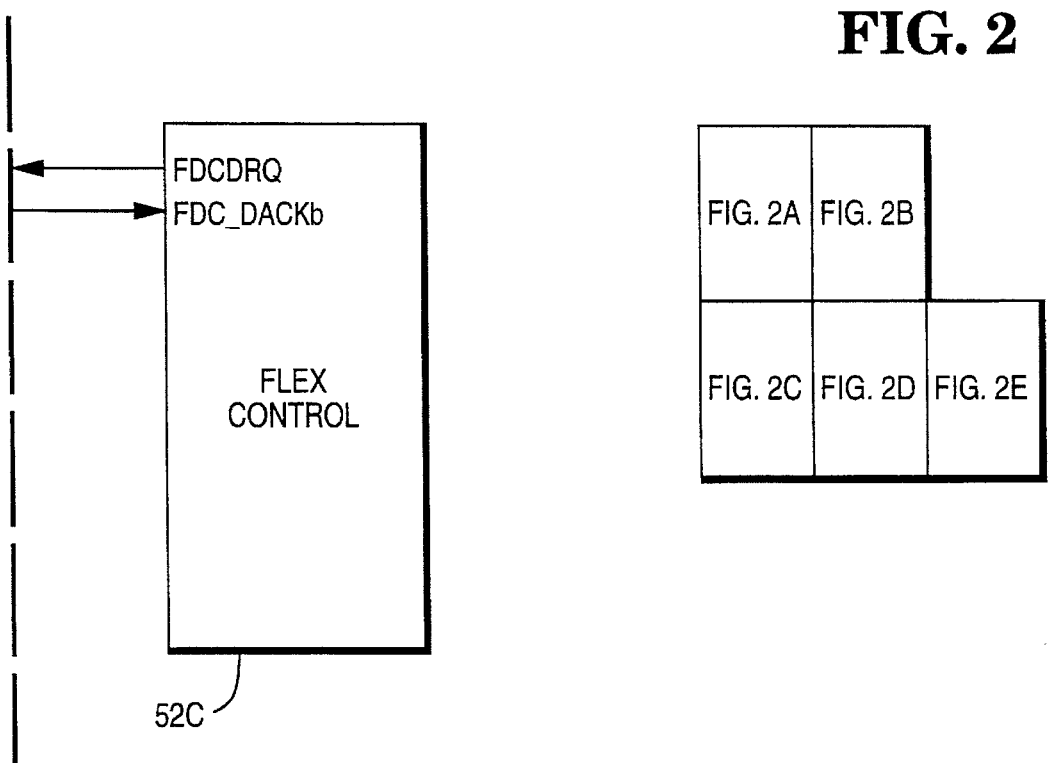
Figure 2E:
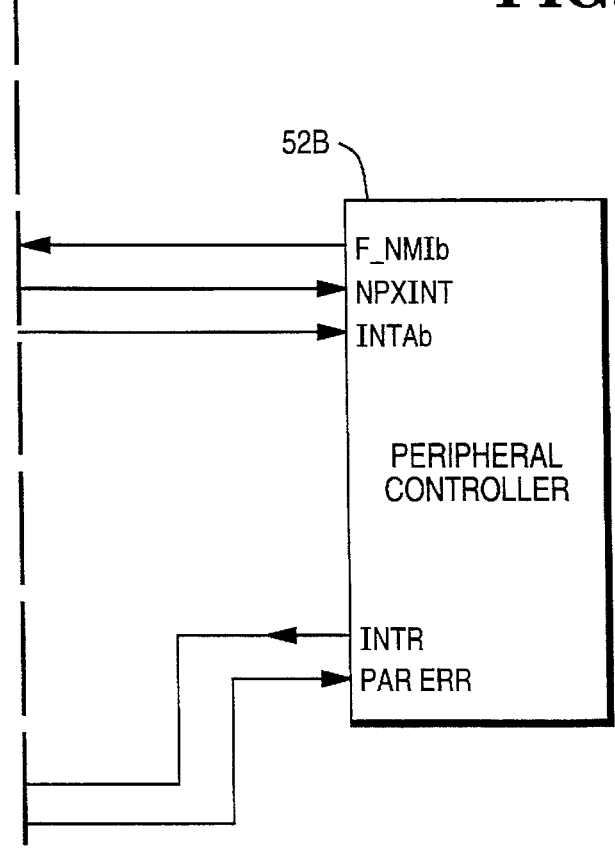

During operation of the system, the signal provided by the CT lines will continue to indicate the type of CPU connected to host P/M bus 20 as long as CPU 10 is the bus master. If BIB 30 becomes bus master after arbitration, the signal on the CT line will dynamically change indicating BIB 30 is the bus master. Restated, the bus master function is transferred from the CPU 10 to the BIB 30 (which is indicated by a dynamic change of the CTIN (0 . . . 1) signal (FIG. 2)) presented to the MIBs 40 and the BIBs 30 as signal CT (0 . . . 1). Thus, the CT indicator signal is used for the dual purpose of identifying the type of CPU and whether CPU 10 or BIB 30 is the bus master.

The detail design of the present invention is captured in CDL, a high level hardware description language. CDL is a software tool which unambiguously defines the hardware for a digital logic system. The following CDL-file in the Index gives an example of the implementation of a part of the embodiment of the work station according to the invention. The listing may be compiled to generate a "C" source code which may then be compiled by a C compiler to generate a standardized C object file format. A logic synthesis program is available from the attached CDL listing.

It will be clear to those skilled in the art that the present invention is not limited to the specific embodiment disclosed and illustrated herein. Nor is the invention limited to applications employing 386, 386SX or 486 processors.

Numerous modifications, variations, and full and partial equivalents can be undertaken without departing from the invention as limited only by the spirit and scope of the appended claims.

Index

```
/*-------------------------------------------------
MULTIPROCESSOR SYNC POINT
--------------------------------------------------*/
.INPUT HARB[3 . . 0];     /* MC ARBITRATION LINES */
.INPUT CSb;               /* CHIPSELECT FROM HOST P/M IF */
.INPUT VALIDb;            /* VALID FROM HPI */
.INPUT IW_Rb;             /* CYCLE DEFINITION SIGNALS */
.INPUT IBEb[3 . . 0];     /* BYTE ENABLES ON XACT BUS */
.INPUT IRESET;            /* RESET LINE ON XACT BUS */
.INPUT NPCLK;
.OUTPUT SLINE;            /* SYNC POINT REACHED SIGNAL */
.BIDI ID[31 . . 0];
/* THE SIGNALS IM/IOb & ID/Cb ARE INCLUDED IN SIGNAL csB!    */
/* WE WILL KEEP THESE TWO SIGNALS NETHERTHELESS IN THE       */
/* DESIGN FOR FARTHER PORPOSES !!!                           */
.IFLEVEL TOP
.CLOCK NPCLK;
.EDGE RISING NPCLK;
.VECTOR 0;
.ELSE
.INPUT NPCLK;
.ASSIGN NPCLK;
.EDGE RISING NPCLK;
.ENDIF
/* DECODE WHAT BIT TO SET OR RESET
    DEPENDING ONT HE ARBITRATION VALUE ON HARB[3 . . 0] */
SELW = !CSb & !VALIDb & IW_Rb;
SP[0] := SELW & (HARB[3 . . 0] == 0) & !IRESET & ID[0]
    #SP[0] & !IRESET & !(SELW & (HARB[3 . . 0] == 0) & !ID[0]);
SP[1] := SELW & (HARB[3 . . 0] == 1) & !IRESET & ID[0]
```

```
                                                            Index

#SP[1] & !IRESET & !(SELW & (HARB[3 . . 0] == 1) & !ID[0]);
SP[2] := SELW & (HARB[3 . . 0] == 2) & !IRESET & ID[0]
    #SP[2] & !IRESET & !(SELW & (HARB[3 . . 0] == 2) & !ID[0]);
SP[3] := SELW & (HARB[3 . . 0] == 3) & !IRESET & ID[0]
    #SP[3] & !IRESET & !(SELW & (HARB[3 . . 0] == 3) & !ID[0]);
SP[4] := SELW & (HARB[3 . . 0] == 4) & !IRESET & ID[0]
    #SP[4] & !IRESET & !(SELW & (HARB[3 . . 0] == 4) & !ID[0]);
SP[5] := SELW & (HARB[3 . . 0] == 5) & !IRESET & ID[0]
    #SP[5] & !IRESET & !(SELW & (HARB[3 . . 0] == 5) & !ID[0]);
SP[6] := SELW & (HARB[3 . . 0] == 6) & !IRESET & ID[0]
    #SP[6] & !IRESET & !(SELW & (HARB[3 . . 0] == 6) & !ID[0]);
SP[7] := SELW & (HARB[3 . . 0] == 7) & !IRESET & ID[0]
    #SP[7] & !IRESET & !(SELW & (HARB[3 . . 0] == 7) & !ID[0]);
SP[8] := SELW & (HARB[3 . . 0] == 8) & !IRESET & ID[0]
    #SP[8] & !IRESET & !(SELW & (HARB[3 . . 0] == 8) & !ID[0]);
SP[9] := SELW & (HARB[3 . . 0] == 9) & !IRESET & ID[0]
    #SP[9] & !IRESET & !(SELW & (HARB[3 . . 0] == 9) & !ID[0]);
SP[10] := SELW & (HARB[3 . . 0] == 10) & !IRESET & ID[0]
    #SP[10] & !IRESET & !(SELW & (HARB[3 . . 0] == 10) & !ID[0]);
SP[11] := SELW & (HARB[3 . . 0] == 11) & !IRESET & ID[0]
    #SP[11] & !IRESET & !(SELW & (HARB[3 . . 0] == 11) & !ID[0]);
SP[12] := SELW & (HARB[3 . . 0] == 12) & !IRESET & ID[0]
    #SP[12] & !IRESET & !(SELW & (HARB[3 . . 0] == 12) & !ID[0]);
SP[13] := SELW & (HARB[3 . . 0] == 13) & !IRESET & ID[0]
    #SP[13] & !IRESET & !(SELW & (HARB[3 . . 0] == 13) & !ID[0]);
SP[14] := SELW & (HARB[3 . . 0] == 14) & !IRESET & ID[0]
    #SP[14] & !IRESET & !(SELW & (HARB[3 . . 0] == 14) & !ID[0]);
SP[15] := SELW & (HARB[3 . . 0] == 15) & !IRESET & ID[0]
    #SP[15] & !IRESET & !(SELW & (HARB[3 . . 0] == 15) & !ID[0]);
IRESETb = !IRESET;
/* ENABLE WRITE MASK-REG DEPENDING ON THE ENALE SIGNALS IBEb[2] & IBEb[3] */
ENWML = !CSb & !IBEb[2] & !VALIDb & !IRESET & IW_Rb;
ENWML = !CSb & !IBEb[3] & !VALIDb & !IRESET & IW_Rb;
.SIGNAL MREGI[15 . . 0],MREGO[15 . . 0];
MUX2(ENWML,MREGO[7 . . 0], ID[23 . . 16], MREGI[7 . . 0]);
RREGISTER(NPCLK,IRESETb,MREGI[7 . . 0],MREGO[7 . . 0]);
MUX2(ENWML,MREGO[15 . . 8], ID[31 . . 24], MREGI[15 . . 8]);
RREGISTER(NPCLK,IRESETb,MREGI[15 . . 8],MREGO[15 . . 8]);
/* ENABLE READ MASK-REG DEPENDING ON THE ENABLE SIGNALS IBEb[2] & IBEb[3] */
!RMASKLb = !CSb & !IBEb[2] & !VALIDb & !IRESET & !IW_Rb;
!RMASKLb = !CSb & !IBEb[3] & !VALIDb & !IRESET & !IW_Rb;
/* ENABLE READ SYNC_POINT-REG DEPENDING ON THE EN-SIGNALS IBEb[0] & IBEb[1] */
!RREGLb = !CSb & !IBEb[0] & !VALIDb & !IRESET & !IW_Rb;
!RREGLb = !CSb & !IBEb[1] & !VALIDb & !IRESET & !IW_Rb;
BUFFER(RMASKLb,MREGO[7 . . 0],ID[23 . . 16]);
BUFFER(RMASKLb,MREGO[15 . . 8],ID[31 . . 24]);
BUFFER(RREGLb,SP[7 . . 0],ID[7 . . 0]);
BUFFER(RREGHb,SP[15 . . 8],ID[15 . . 8]);
SETL1=(SP[0] # MREGO[0]) & (SP[1] # MREGO[1]) &
      (SP[2] # MREGO[2]) & (SP[3] # MREGO[3]) &
      (SP[4] # MREGO[4]) & (SP[5] # MREGO[5]) &
      (SP[6] # MREGO[6]) & (SP[7] # MREGO[7]) &
      (SP[8] # MREGO[8]) & (SP[9] # MREGO[9]) &
      (SP[10] # MREGO[10]) & (SP[11] # MREGO[11]) &
      (SP[12] # MREGO[12]) & (SP[13] # MREGO[13]) &
      (SP[14] # MREGO[14]) & (SP[15] # MREGO[15]);
RESETSLINE=
      (!SP[0] #MREGO[0]) & (!SP[1] # MREGO[1]) &
      (!SP[2] #MREGO[2]) & (!SP[3] # MREGO[3]) &
      (!SP[4] #MREGO[4]) & (!SP[5] # MREGO[5]) &
      (!SP[6] #MREGO[6]) & (!SP[7] # MREGO[7]) &
      (!SP[8] #MREGO[8]) & (!SP[9] # MREGO[9]) &
      (!SP[10] #MREGO[10]) & (!SP[11] # MREGO[11]) &
      (!SP[12] #MREGO[12]) & (!SP[13] # MREGO[13]) &
      (!SP[14] #MREGO[14]) & (!SP[15] # MREGO[15]);
/* SYNCRONISATION LINE OUTPUT */
SLINE := SETL1
      # SLINE & !RESETSLINE;
.END;
```

What is claimed is:

1. An architecture for a work station comprising:

a system clock for providing a clock signal with a first frequency;

a CPU selected from a group of CPUs differing in certain operational parameters;

a bus interface circuit connected between an external bus and said CPU and coupled to said system clock; and a control line connected to said interface circuit which provides a signal indicating the type of CPU connected to said circuit;

wherein said interface circuit comprises means for selectively responding to the signal provided by the control line to convert said first frequency to a second frequency for use in transferring data between said CPU and said interface.

2. The architecture of claim 1, further comprising:
a local bus connecting said CPU and interface circuit.

3. The architecture of claim 2, wherein the system clock is connected to said CPU.

4. The architecture of claim 3 wherein said CPU converts said first frequency to said second frequency to clock its operation.

5. The architecture of claim 4 wherein said circuit uses said second frequency to time the transfer of data between said circuit and local bus.

6. The architecture of claim 5, further comprising:
a self-contained functional block independent of said CPU and said interface circuit and connected to said local bus for providing the signal to said control line.

7. The architecture of claim 2 wherein said signal further indicates whether said CPU or bus interface circuit is bus master of said local bus.

8. The architecture of claim 7, further comprising:
a plurality of bus interface circuits respectively connected between said local bus and a corresponding number of external busses, each of said circuits connected to said control line.

9. The architecture of claim 8 wherein each of said external busses is a microchannel bus.

10. The architecture of claim 8, further comprising:
a plurality of memory interface circuits connected between said local bus and respective memories, each of said circuits connected to said control line.

11. The architecture of claim 10 wherein said local bus includes lines connecting each of said bus interface circuits with an arbitrator for transmitting a local bus access request thereto and further lines for transmitting a local bus granting signal from the arbitrator to a selected one of said bus interface circuits requesting access upon priority arbitration.

12. An architecture for a work station comprising:
a CPU selected from a group of CPUs differing in certain operational parameters;
a bus interface circuit connected between an external bus and said CPU;
a local bus connecting said CPU and interface circuit;
a system clock connected to said CPU and interface circuit for providing a clock signal with a first frequency;
a self-contained functional block independent of said CPU and interface circuit and connected to said local bus; and
a control line connected between said block and interface circuit for providing a signal to said circuit indicating the type of CPU connected to said circuit and whether said CPU or circuit is bus master of said local bus;
wherein said CPU selectively converts said first frequency to a second frequency to clock its operation; and
wherein said bus interface circuit selectively responds to the signal on said control line to convert said first to said second frequency.

13. The architecture of claim 12, further comprising:
a plurality of bus interface circuits respectively connected between said local bus and a corresponding number of external busses, each of said circuits connected to said control line; and
a plurality of memory interface circuits connected between said local bus and respective memories, each of said circuits connected to said control line;
wherein said local bus includes lines connecting each of said bus interface circuits with an arbitrator for transmitting a local bus access request thereto and further lines for transmitting a local bus granting signal from the arbitrator to a selected one of said bus interface circuits requesting access upon priority arbitration.

14. The architecture of claim 13 wherein each of said external busses is a microchannel bus.

15. A method for operating a work station which includes a CPU selected from CPUs of differing operational parameters, and including an interface circuit connected between an external bus and said CPU, comprising:
providing a clock signal to said circuit;
providing an indicator signal to said circuit indicating the type of CPU selected; and
selectively changing a frequency of said clock signal in said circuit in response to said indicator signal.

16. The method of claim 15 further comprising: providing said clock signal to said CPU.

17. The method of claim 16 further comprising:
changing the frequency of said clock signal in said CPU to time its operation.

18. The method of claim 17 wherein said indicator signal is provided by a self-contained functional block independent of said CPU and said interface circuit and connected to said local bus, further comprising:
using said indicator signal to indicate whether said bus interface circuit or CPU is the bus master.

* * * * *